US012607215B2

(12) United States Patent
Zhai

(10) Patent No.: US 12,607,215 B2
(45) Date of Patent: Apr. 21, 2026

(54) CLAMPING LOCK

(71) Applicant: Ningbo Ego International Co., Ltd.,
Ningbo (CN)

(72) Inventor: Yiquan Zhai, Shanghai (CN)

( * ) Notice: Subject to any disclaimer, the term of this
patent is extended or adjusted under 35
U.S.C. 154(b) by 517 days.

(21) Appl. No.: 18/052,905

(22) Filed: Nov. 4, 2022

(65) Prior Publication Data
US 2023/0279705 A1 Sep. 7, 2023

Related U.S. Application Data

(60) Provisional application No. 63/289,155, filed on Dec.
14, 2021, provisional application No. 63/275,485,
filed on Nov. 4, 2021.

(51) Int. Cl.
*F16B 12/40* (2006.01)
*F16B 7/04* (2006.01)
*F16B 12/32* (2006.01)

(52) U.S. Cl.
CPC ............ *F16B 12/40* (2013.01); *F16B 7/0433*
(2013.01); *F16B 12/32* (2013.01); *Y10T*
*403/595* (2015.01); *Y10T 403/7171* (2015.01)

(58) Field of Classification Search
CPC .. A47B 47/0091; A47C 13/005; B60D 1/025;
E04B 9/10; E04B 2001/2472; F16B 2/06;
F16B 2/18; F16B 2/185; F16B 2/22;
F16B 2/24; F16B 2/241; F16B 2/245;
F16B 2/246; F16B 7/0433; F16B 12/10;
F16B 12/20; F16B 12/2009; F16B 12/24;
F16B 12/26; F16B 12/32; F16B 12/40;

F16B 2012/103; F16B 2012/209; Y10T
403/348; Y10T 403/595; Y10T 403/7123;
Y10T 403/7129; Y10T 403/7171; Y10T
403/7176
USPC ............ 403/177, 322.4, 388, 389, 396, 397;
297/248
See application file for complete search history.

(56) References Cited

U.S. PATENT DOCUMENTS

| | | | | |
|---|---|---|---|---|
| 2,180,558 A | * | 11/1939 | Stastny ................... | B60D 1/025 |
| | | | | 278/96 |
| 2,224,522 A | * | 12/1940 | Peterson ................ | B60D 1/025 |
| | | | | 280/515 |
| 2,547,326 A | * | 4/1951 | Kellogg ................. | B60D 1/025 |
| | | | | 24/DIG. 35 |
| 2,558,907 A | * | 7/1951 | Milner ................... | B60D 1/025 |
| | | | | 411/342 |
| 3,197,239 A | * | 7/1965 | Jezek, Jr. ............... | B60D 1/025 |
| | | | | 24/523 |
| 3,572,766 A | * | 3/1971 | Jezek ..................... | B60D 1/025 |
| | | | | 280/515 |
| 6,145,866 A | * | 11/2000 | Peter ...................... | B60D 1/025 |
| | | | | 403/325 |
| 7,350,760 B2 | * | 4/2008 | Yamaura ................. | E04G 17/04 |
| | | | | 403/322.4 |

(Continued)

FOREIGN PATENT DOCUMENTS

EP 2106720 A1 * 10/2009 ............. F16B 12/20

*Primary Examiner* — Josh Skroupa
(74) *Attorney, Agent, or Firm* — WPAT LAW. P.C.;
Anthony King

(57) ABSTRACT

A modular furniture quick assembly system implementing
toggle latches and pins to couple two adjacent structural
tubes together. The toggle latch has a catch arm that engages
with the pin. The pin is inserted at least partially through one
or both of the adjacent structural tubes.

10 Claims, 18 Drawing Sheets

(56) References Cited

U.S. PATENT DOCUMENTS

| | | | |
|---|---|---|---|
| 11,885,362 B2 * | 1/2024 | Wang | F16B 2/18 |
| 12,331,768 B2 * | 6/2025 | Hochgesang | F16B 12/2009 |
| 2023/0323906 A1 * | 10/2023 | Hochgesang | F16B 12/20 |
| 2025/0163948 A1 * | 5/2025 | Zhu | F16B 12/32 |

* cited by examiner

15

118

120 —  — 112

140 —

138

112 — 120

138

118

125

139

10

20

440

CLAMPING LOCK

CROSS-REFERENCES

This application claims priority to, and is a non-provisional patent application of, U.S. provisional patent application No. 63/289,155, filed on Dec. 14, 2021, which is hereby incorporated by reference in its entirety.

This application claims priority to, and is a non-provisional patent application of, U.S. provisional patent application No. 63/275,785, filed on Nov. 4, 2021, which is hereby incorporated by reference in its entirety.

Although incorporated by reference in their entireties, no arguments or disclaimers made in the parent applications apply to this application. Any disclaimer that may have occurred in the above-referenced applications is hereby expressly rescinded.

FIELD OF THE DISCLOSURE

The present disclosure relates to a furniture system, more particularly, a system allowing quick, easy, and secure assembly of a furniture piece

BACKGROUND OF THE INVENTION

Generally, a piece of furniture such as a sofa or a table is fully assembled at the factory to ensure the proper structural integrity of each piece is maintained by the time the furniture piece is delivered to the end consumer. In recent years it has been known that substantial savings in storage and shipping costs can be achieved by selling unassembled pieces of furniture where the end consumer is required to assemble the parts together.

Assembling a furniture piece together takes time, patience, tools, and skills. Known unassembled furniture pieces is often accompanied by a hex key, a bag of fasteners (i.e., screws, bolts, washers) of various lengths and sizes, and a complicated installation manual with figures. Some installation manuals are too long-winded with pages and pages of text, while some others are too simplified with only drawing figures and no text, leaving much to the end consumer's imagination.

The enclosed bag of fasteners and tools in the prior art can be intimidating for some end consumers, especially those who are not handy. When a bolt and a nut are involved, a user would need to use a ratchet in one hand while using a wrench in another to engage both the bolt and the nut at the same time. Such procedure is often awkward and time-consuming.

There is a continuing need for new ways to allow an end consumer to assemble a furniture piece together.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned needs. Although the present embodiments may obviate one or more of the above-mentioned needs, it should be understood that some aspects of the embodiments might not necessarily obviate them.

SUMMARY OF THE INVENTION

In a general implementation, a modular furniture piece having a plurality of panels each having an internal frame and is at least partially covered by an outer covering, and the internal frame can be made of hollow structural tubes to provide structural integrity to each of the panels. Wherein a toggle latch can be used to detachably couple the panels together.

In an aspect combinable with the general implementation, a pin is provided to work with the toggle latch.

In an aspect combinable with the general implementation, the toggle latch has a catch arm and a main housing, wherein the catch arm is pivotable from the main housing.

In an aspect combinable with the general implementation, the catch arm can be in any conceivable shapes and sizes, and can take the form of any known toggle latch catch arms available in the market.

In an aspect combinable with the general implementation, the catch arm can be an arc-spring.

In an aspect combinable with the general implementation, the catch arm can have a curvature but does not necessarily have to function as a spring.

In an aspect combinable with the general implementation, the pin can be a separate piece from the toggle latch.

In an aspect combinable with the general implementation, the pin can be an integral piece with the toggle latch.

In an aspect combinable with the general implementation, the pin can be disposed through at least one wall of the first hollow structural tube.

In an aspect combinable with the general implementation, the pin can be disposed through two walls of the first hollow structural tube.

In an aspect combinable with the general implementation, the pin can be disposed through two walls of the first hollow structural tube, as well as at least one wall of the second hollow structural tube.

In an aspect combinable with the general implementation, the pin can a rod or a bolt, and can be made of various types of materials.

In an aspect combinable with the general implementation, the pin can have a pin head, and the pin head can have a pin head opening to receive therein part of the catch arm.

In another aspect combinable with the general implementation, the hollow structural tube can be made of metal or other natural or synthetic material.

In another aspect combinable with the general implementation, the toggle latch is not fixedly attached to the furniture panel. The toggle latch can be detachably attached to the hollow structural tube by using a base plate having a base insert that inserts into a receiving hole of the hollow structural tube.

In another aspect combinable with the general implementation, the toggle latch is not fixedly attached to the furniture panel. The toggle latch can be detachably attached to the hollow structural tube by using a base plate having a base aperture that allows the pin to pass therethrough.

In still another aspect combinable with the general implementation, the pin can be freely separatable from the toggle latch, and one end of the pin is detachably coupled to the catch arm of the toggle latch, while the other end of the pin is detachably coupled to the base plate of the toggle latch.

In still another aspect combinable with the general implementation, the pin can be an integral part of the toggle latch.

In still another aspect combinable with the general implementation, the pin can be an integral part of the base plate of the toggle latch.

In still another aspect combinable with the general implementation, the pin can be an integral part of the catch arm of the toggle latch.

In a further aspect combinable with the general implementation, the base plate can be pivotably coupled to the main housing of the toggle latch, and there can be a receiving ring disposed at the distal end of the catch arm. The base plate can be fixedly connected to the pin, and wherein the pin is sufficiently long such that a distal end of the pin is capable a being received within the receiving ling of the catch arm.

In another aspect combinable with the general implementation, the toggle latch can be fixedly attached to the hollow structural tube by fasteners such as screws and bolts.

In another aspect combinable with the general implementation, the toggle latch can be fixedly attached to the hollow structural tube by welding.

In another aspect combinable with the general implementation, the contemplated modular furniture piece can be an armchair, a lounge chair, a sofa, a side table, or a coffee table.

In another aspect combinable with the general implementation, the outer covering of the panel of the furniture piece can be a natural or synthetic rattan.

Accordingly, the present disclosure is directed to a modular furniture system using toggle latches in combination with pins that substantially obviate one or more problems due to limitations and disadvantages of the related art.

While this specification contains many specific implementation details, these should not be construed as limitations on the scope of any inventions or of what may be claimed, but rather as descriptions of features specific to particular implementations of particular inventions.

Certain features that are described in this specification in the context of separate implementations can also be implemented in combination in a single implementation. Conversely, various features that are described in the context of a single implementation can also be implemented in multiple implementations separately or in any suitable subcombination.

Although features may be described above and below as acting in certain combinations and even initially claimed as such, one or more features from a claimed combination can in some cases be excised from the combination, and the claimed combination may be directed to a subcombination or variation of a subcombination.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

Figure 1:
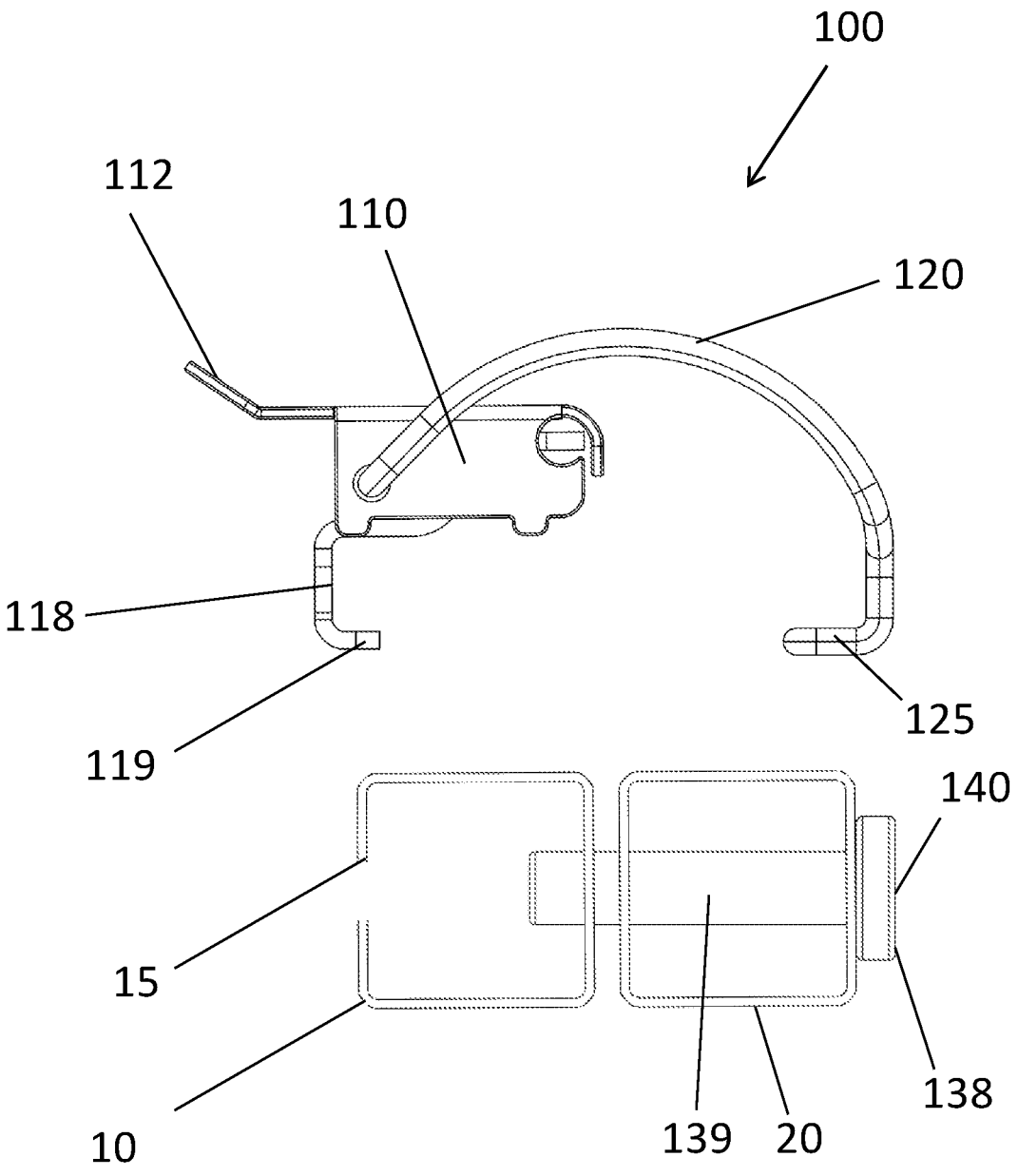
FIG. 1 is a side view of an embodiment of a toggle latch in combination with a pin according to an aspect of the disclosure.

The following call-out list of elements in the drawing can be a useful guide when referencing the elements of the drawing figures:

10 Square metal tube
15 Receiving hole
20 Square metal tube
100 Toggle latch
110 Main housing
112 Thumb tab
117 Base aperture
118 Base Plate
119 Base Insert
120 Catch arm/Arc-spring
125 Hook
130 Coupling means 138 Pin head
139 Pin
140 Pin head opening
218 Base Plate
220 Catch arm/Arc-spring
226 Receiving Ring
239 Pin
310 Bolt
320 Fixing Plate
322 Threaded hole
339 Pin
350 Fixing Arm
351 Catcher
400 Cam Clamp
410 Cam lobe
412 Key hole
414 Center of rotation
416 First Flat Cam Surface
418 Second Flat Cam Surface
430 Screw shaft
440 Nut
450 Hex Key
450 Retaining Plate

DETAILED DESCRIPTION

The different aspects of the various embodiments can now be better understood by turning to the following detailed description of the embodiments, which are presented as illustrated examples of the embodiments as defined in the claims. It is expressly understood that the embodiments as defined by the claims may be broader than the illustrated embodiments described below.

As used herein, the term "structural tube" refers to a structural frame for a furniture piece. Although the name "tube" is used throughout much of the specification as an example of internal frame in a furniture panel, the structural frame can be hollow or solid. It can be generally described as a beam, which can be hollow or solid. This beam can be a hollow metal tube having a squarish cross-sectional shape, or a round cross-sectional shape. It can also be in other cross-sectional shapes. Its material can be metal, non-metal, wood, bamboo, and all conceivable natural or synthetic materials. It will, nevertheless, be understood that no limitation of the scope of the disclosure is thereby intended.

Toggle latches are known to fasten two items together. Referring now to FIG. 1, an improved version of a toggle latch 100 is provided. here, a main part of the toggle latch includes a main housing 110 and a catch arm 120 pivotably attached to the main housing 110.

The catch arm 120 is contemplated to have various different configurations. The configuration shown in FIG. 1 is an arc-spring 120 that provide resiliency to act as a spring. By using an arc-spring 120 configuration, the catch arm 120 can tightly couple structural tube 10 and structural tube 20 together.

Here, structural tube 10 can have receiving hole 15. The pin 139 has a length that spans across the two walls of structural tube 20 and one wall of structural tube 10. The pin 139 can have a pin head 138 which can have a pin head opening 140. The pin head opening 140 can be a deep hole, a through hole, or an indentation.

Figure 4:
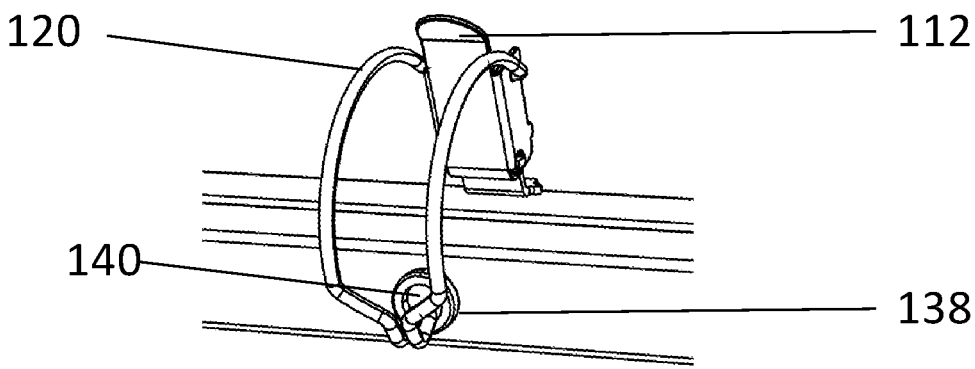
FIG. 4 is a perspective view of the embodiments shown in FIGS. 1 and 3, according to an aspect of the disclosure.
Figure 5:
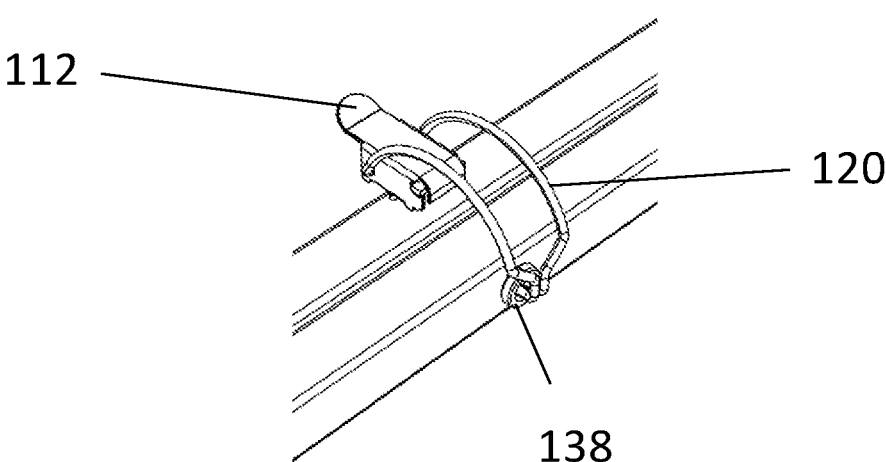
FIG. 5 is a perspective view of the embodiment of FIG. 5 in a locked position.

In one embodiment, the distal end of the catch arm 120 can be received into the pin head opening 140 (as shown in FIGS. 4 and 5). This distal end of the catch arm 120 can be a hook 125.

In another embodiment, the distal end of the catch arm 120 does not receive into the pin head opening 140 (not shown). Instead, it can wrap around the pin head 138 and catch the pin head 138.

Figure 2:
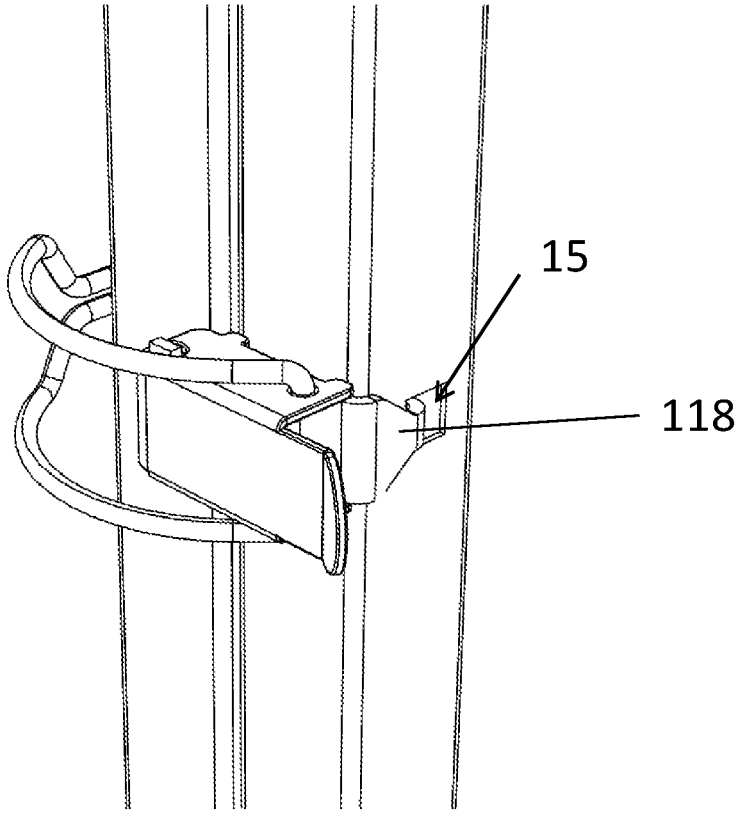
FIG. 2 is a perspective view of the system of FIG. 1 in operation, according to an aspect of the disclosure.

Referring back to FIG. 1, the main housing 110 can have a base plate 118 pivotably attached thereto. The base plate 118, despite its name being a "plate," is not limited to having a generally flat configuration like a disc. The base plate 118 can be in any conceivable shape and thickness. Here, the contemplated base plate 118 of FIG. 1 has a base insert 119 that hooks into and through the receiving hole 15 of the structural tube 10 (see FIG. 2). This base insert 119 can anchor the toggle latch 100 in its manufacturer-intended location.

The pin 139 can prevent lateral and relative movement of the two adjacent structural tubes 10, 20. When the toggle latch 100 is locked, the pin 139, by having inserted (at least partially) through both structural tubes 10, 20, keeps them from sliding out of place.

The toggle latch 100 of FIG. 1 is not fixedly coupled to the structural tube 10. Instead, the toggle latch 100 contemplated here can be free detached from both structural tubes 10, 20, is first fastened the hollow square structural tube 10. This main part of the toggle latch can be fastened onto structural tube 10 by various known methods such by welding, by fasteners (e.g., screws, bolts), or it can be temporarily latched onto structural tube 10 using any type of structure that can fit onto the structural tube 10. For example, there can be a corresponding hole somewhere on the structural tube 10 (not shown) and there can be some kind of protrusion on the main part of the toggle latch to fit into the hole so that the main part of the toggle latch can at least temporarily catch onto the structural tube 10. In the embodiment shown in FIG. 1, this main part of the toggle latch is welded onto the structural tube 10.

Figure 3:
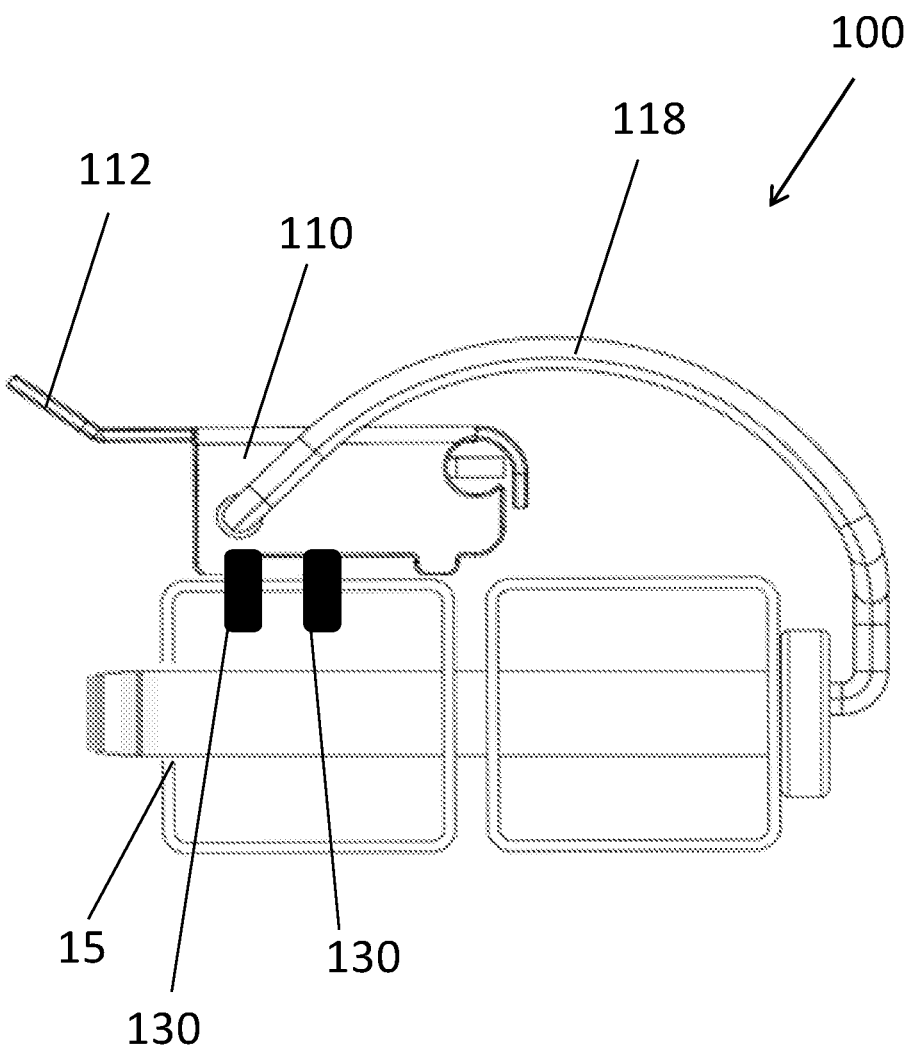
FIG. 3 is a side view of another embodiment of a toggle latch in combination with a pin according to an aspect of the disclosure.

As shown in FIG. 3, this contemplated toggle latch 100 is fixedly attached to structural tube 10 by the manufacturer. This can be done by fasteners 130 and/or welding 130. Here, the pin is contemplated to be much longer than that shown in FIG. 1. This longer pin can also be used by the toggle latch 100 of FIG. 1, and vise versa.

In should be noted that the pin in both FIG. 1 and FIG. 3 are freely detachable from the structural tubes 10, 20. During assembly, an end user would insert the pin into and through the structural tubes at locations marked by the manufacturer.

For this purpose, the manufacturer would have also provided holes on structural tubes 10, 20 for the pin to insert therethrough. These through holes are contemplated to align.

Figure 6:
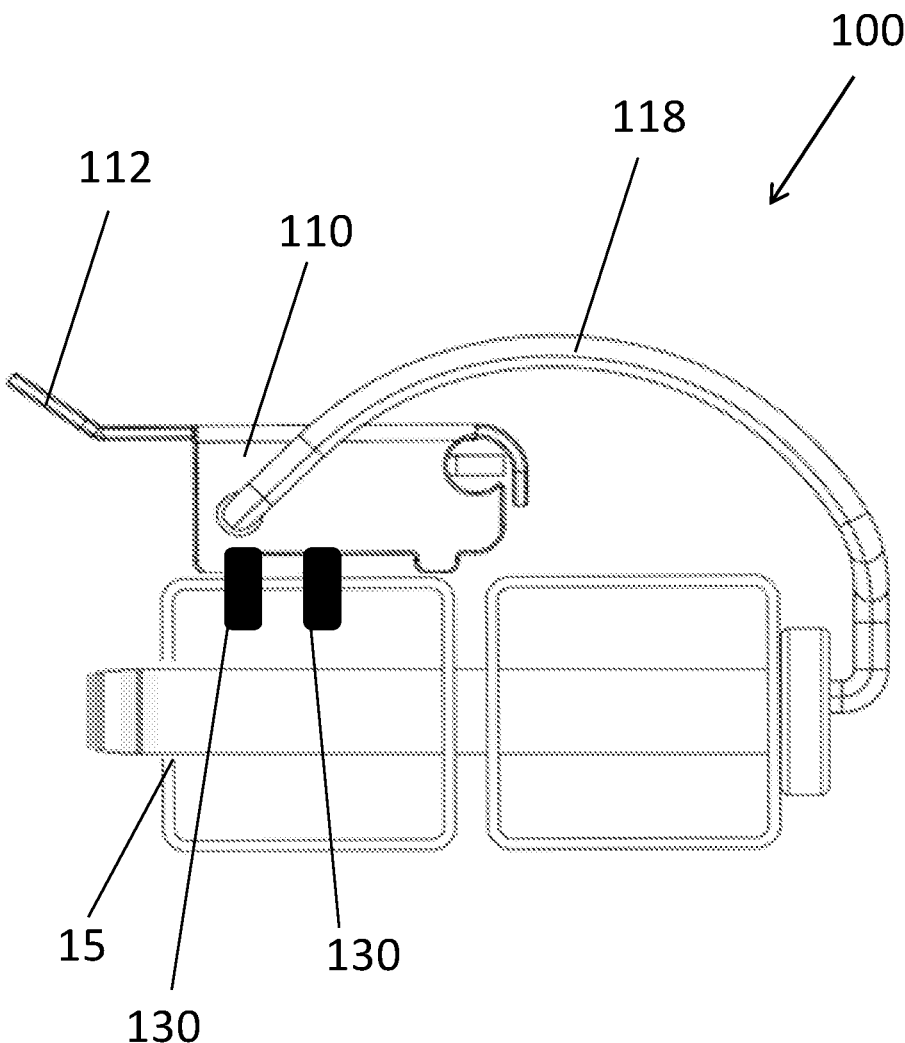
FIG. 6 is a side view of yet another embodiment of a toggle latch in combination with a pin according to an aspect of the disclosure.

Referring now to FIG. 6, there can be a base plate 130 having a shape to wrap around the structural tube 10. This base plate 130 is sufficiently long and can have a base aperture 117, which is an opening, to receive the distal end of the pin 139. Here, this pin 139 is also freely detachable from both tubes 10, 20.

Figure 7:
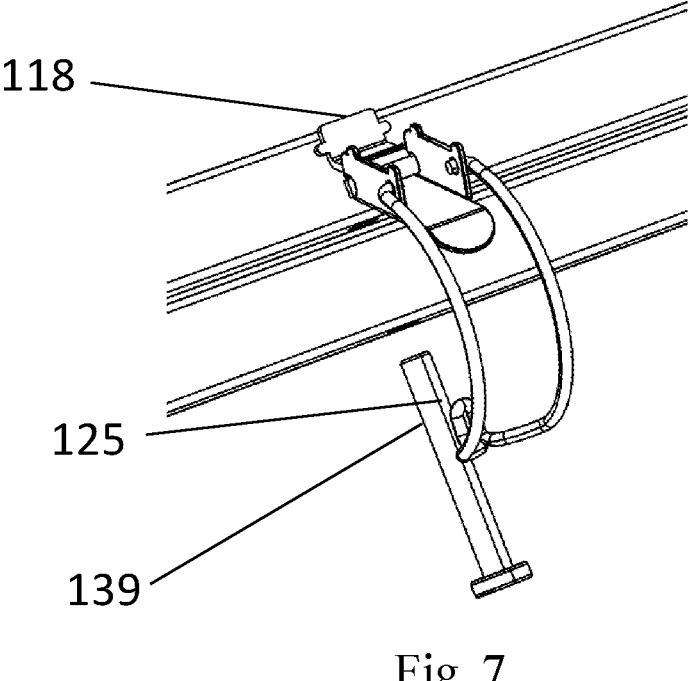
FIG. 7 is a perspective view of the embodiment of FIG. 6 according to one aspect of the disclosure.
Figure 8:
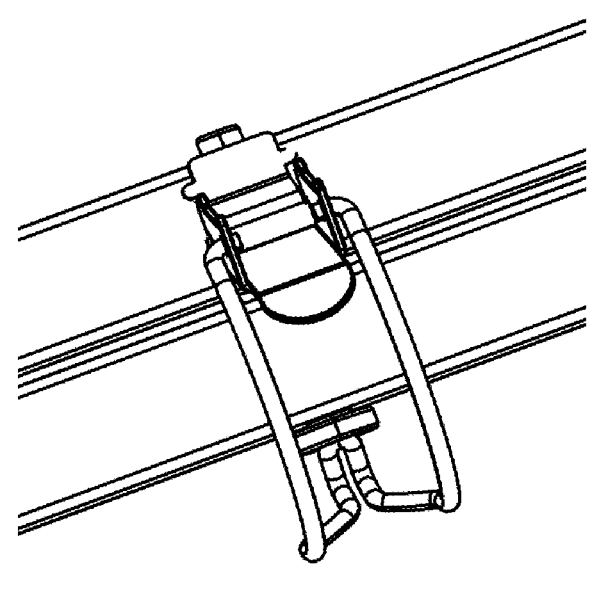
FIG. 8 is a perspective view of the embodiment of FIG. 7 according to one aspect of the disclosure.

In FIG. 7, the pin is shown prior to being received at the base plate 130 of FIG. 6. In FIG. 8, the pin is received at the base plate 130.

Figure 9:
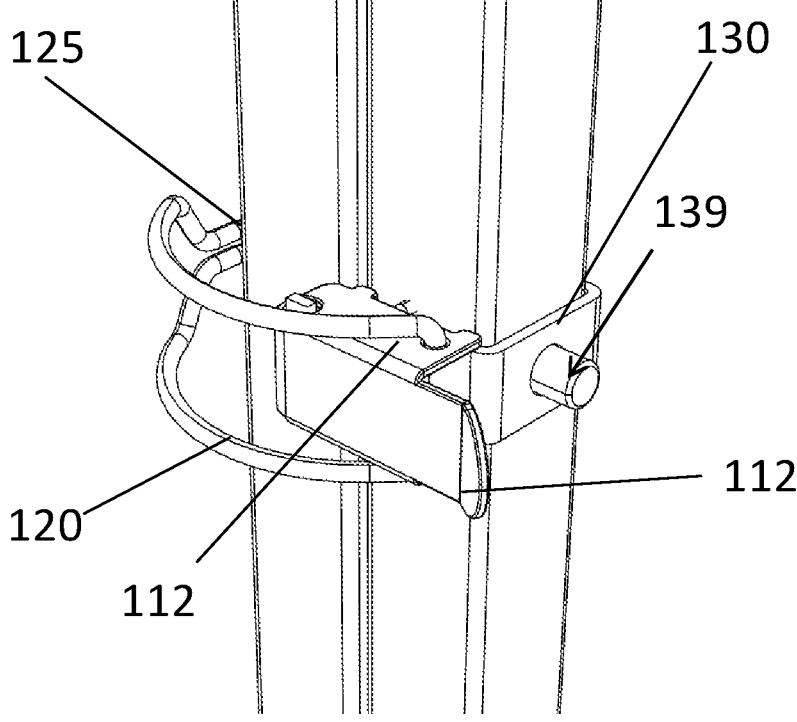
FIG. 9 is a perspective view of the embodiment of FIG. 7 coupling two hollow structural tubes together, according to one aspect of the disclosure.

In operation, the end user can first insert the pin 139 through the holes on the structural tubes 10, 20, then place the toggle latch 100 in position, aligning the base aperture to the distal tip of the pin 139 first (see FIG. 9).

Figure 10:
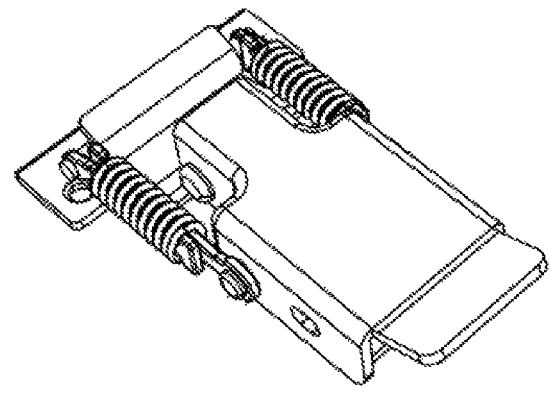
FIG. 10 is a perspective view of a prior art design of a toggle latch.
Figure 11:
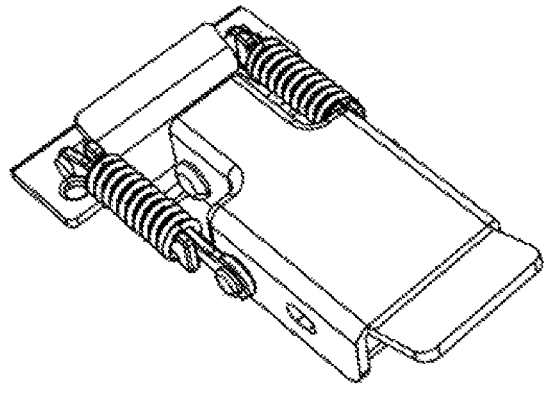
FIG. 11 is a perspective view of prior art toggle latches.

As mentioned above, the catch arm 120 are shown herein as an arc-spring. One skilled in the art would immediately recognize that other configurations beside an arc-spring can be used. FIGS. 10 and 11 show other known configuration in typical toggle latches. All of these configurations may be implemented.

Figure 12:
FIG. 12 is a side view of yet another embodiment, according to one aspect of the disclosure.
Figure 12:
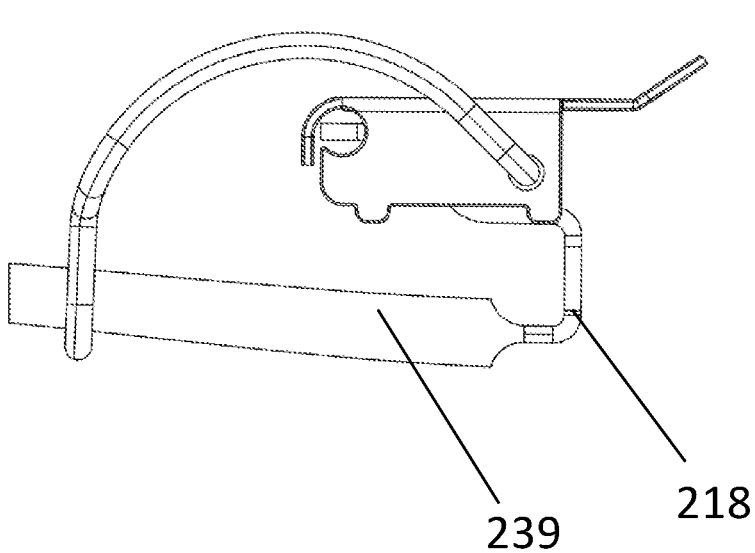

FIG. 12 illustration one embodiment where the pin 239 is an integral part of the base plate 218. During assembly, the end user would first insert the pin 218 through the structural tubes 10, 20 at appropriate places, then the catch arm would come across and catch the distal end of the pin 239.

Figure 13:
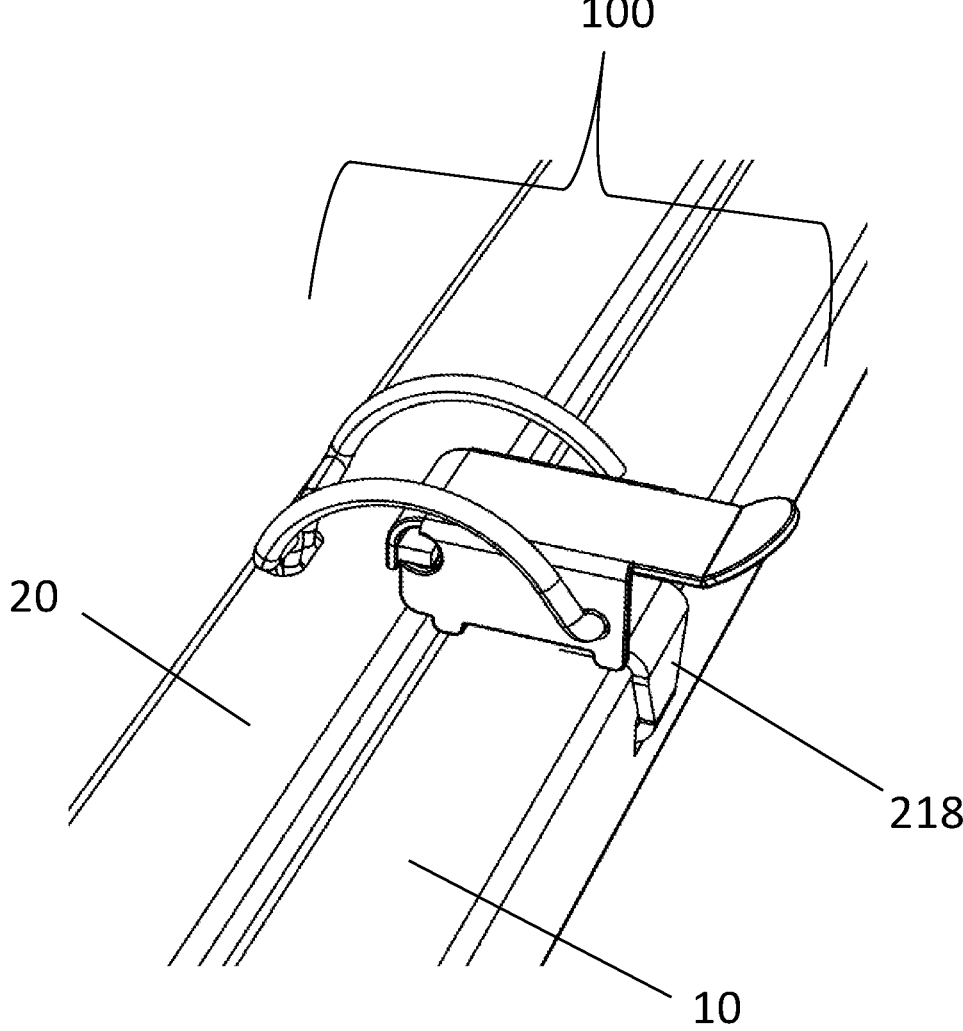
FIG. 13 is a perspective view of still another embodiment of a toggle latch in combination with a pin (not shown) according to an aspect of the disclosure.
Figure 14:
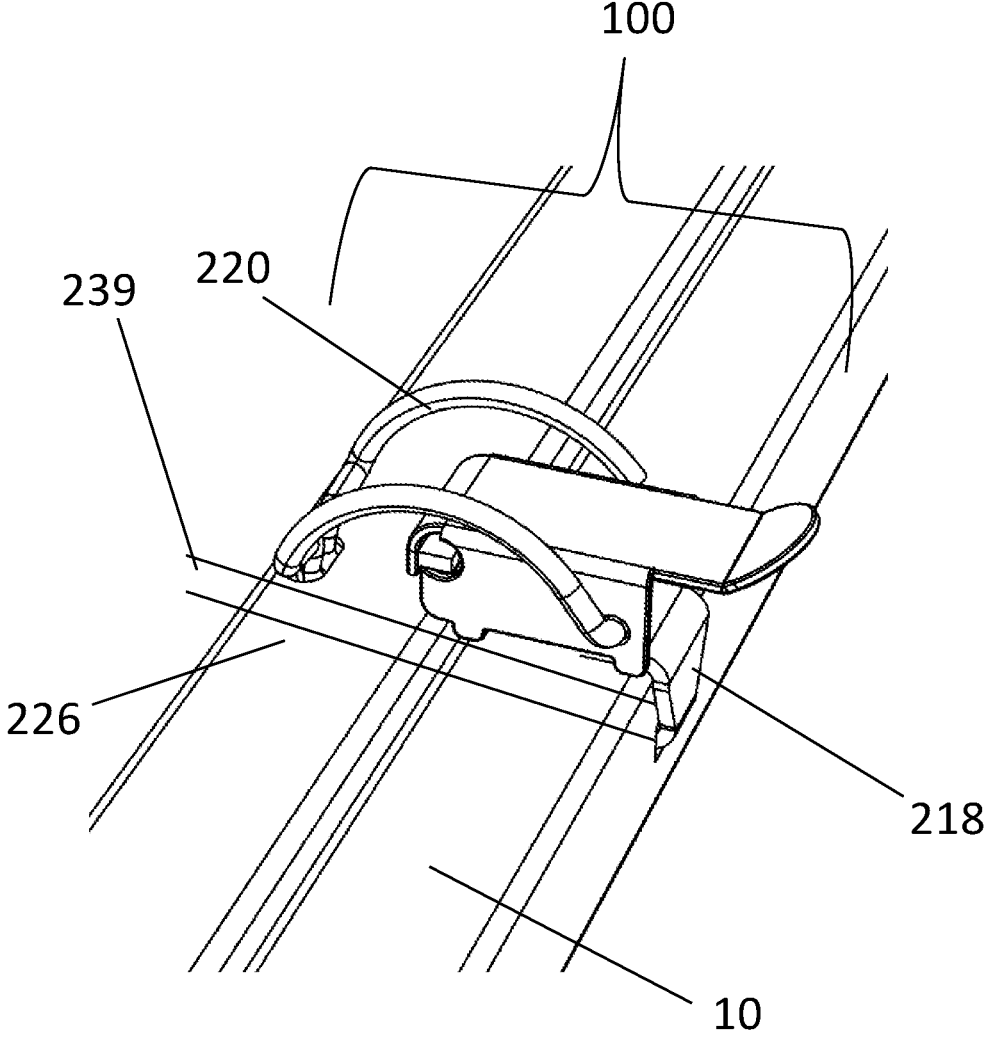
FIG. 14 is a perspective view of the embodiment of a toggle latch of FIG. 13 in combination with a pin (in broken lines) according to an aspect of the disclosure.
Figure 15:
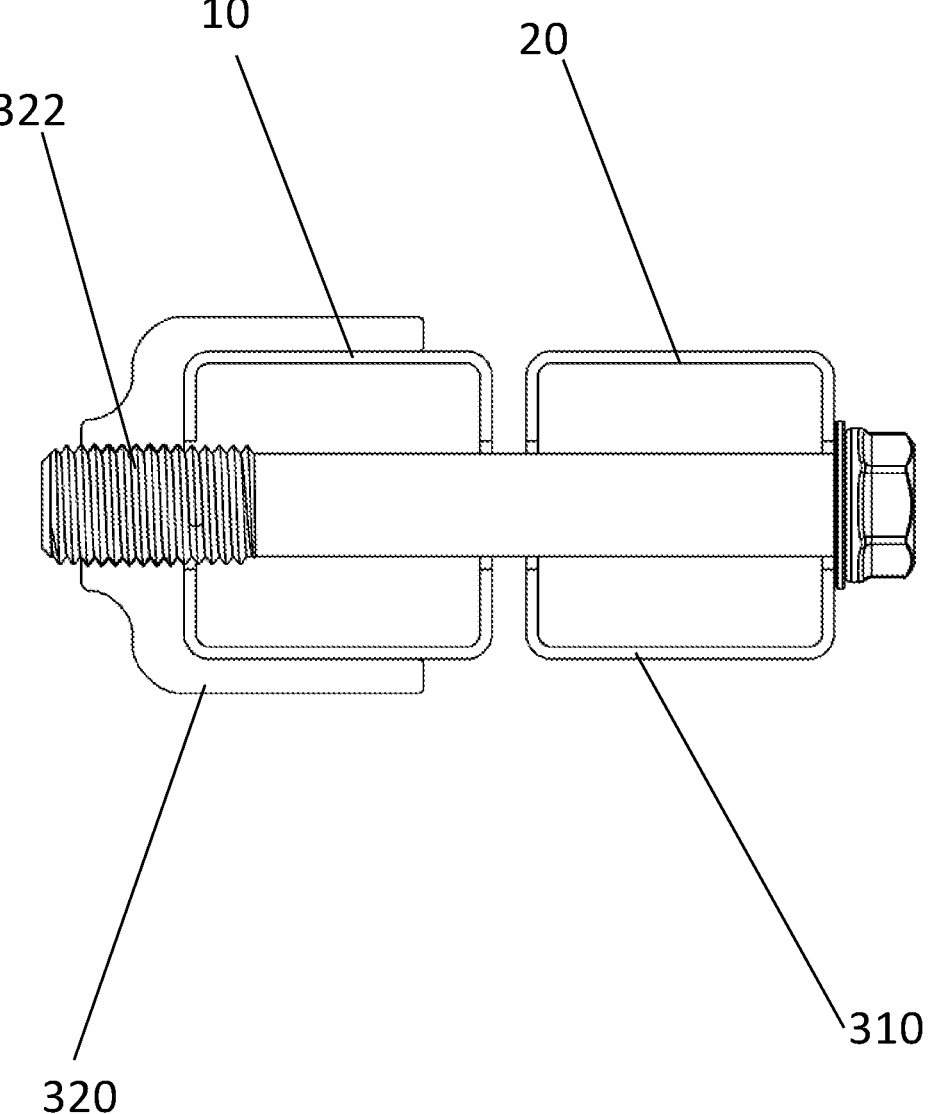
FIG. 15 is a cross-sectional view of a fixing plate in combination with a bolt, according to an aspect of the disclosure.
Figure 16:
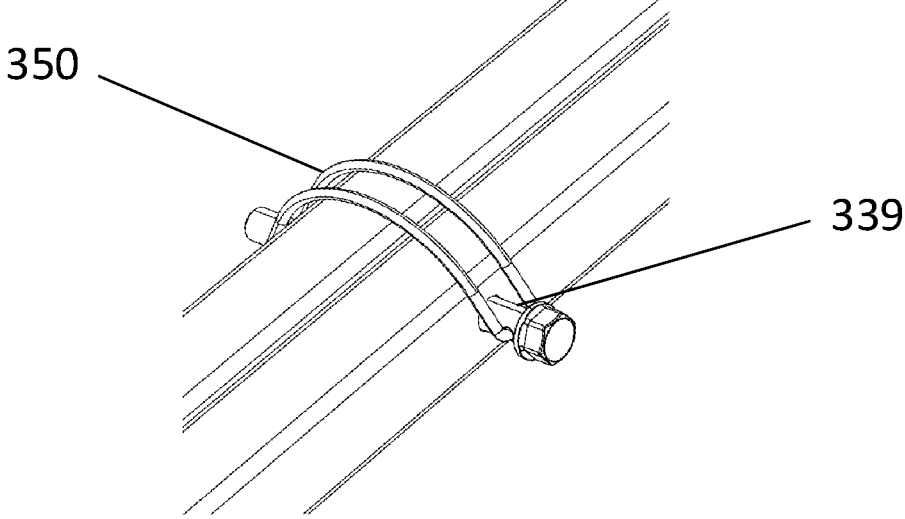
FIG. 16 is a perspective view of a pin having a fixing arm, according to an aspect of the disclosure.
Figure 17:
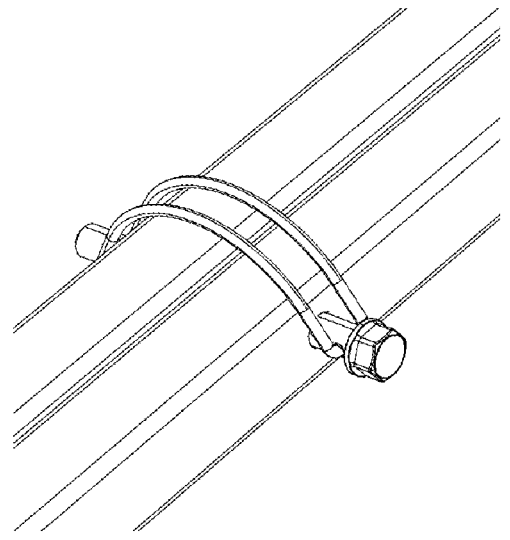
FIG. 17 is a perspective view of a pin having a fixing arm of FIG. 16 with the fixing arm in an attached position, according to an aspect of the disclosure.

In FIG. 13, the catch arm catches the distal end of the pin 239 by insert through a top hole of the structural tube 10, and meet the distal end of the pin 239 in the interior of the structural tube 10 (see broken line illustration in FIG. 14).

There can be other ways to secure two adjacent structural tubes 10, 20. In FIG. 13, a bolt 310 is inserted through both tubes 10, 20 and matingly screws into the threaded hole 322 of a fixing plate 320. The fixing plate 320 is freely separable from the structural tube 10 and acts as a nut.

Another way to secure two adjacent structural tube 10, 20 includes using pin 339 (which can be used alone or in combination with any of the toggle latches 100 discussed herein) that has a fixing arm 30 attached thereto.

Figure 18:
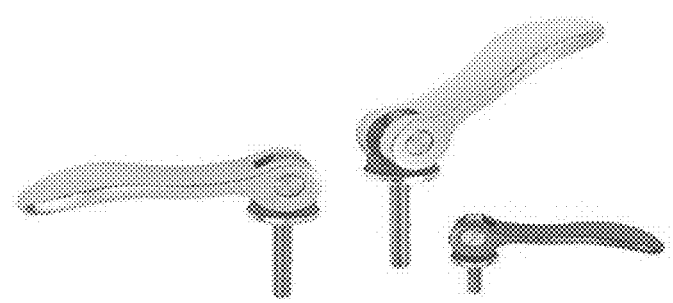
FIG. 18 shows examples of prior art cam clamps.

Referring now to FIG. 18 which shows typically known cam lever clamps widely used in bicycles and exercise equipment to provide quick tightening of certain parts.

Figure 19:
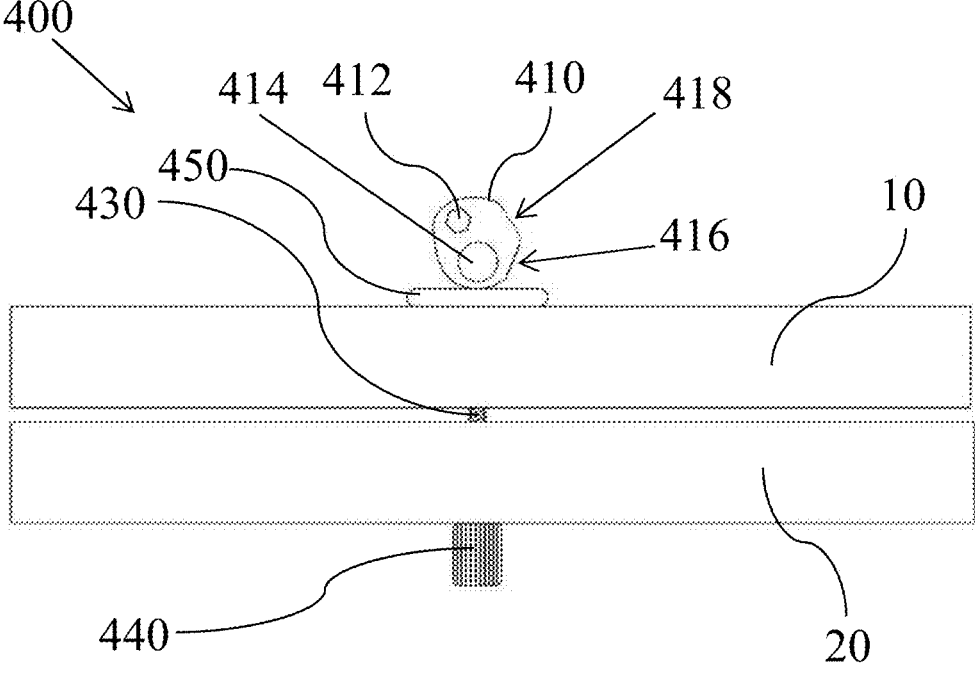
FIG. 19 is a side view of a cam lock, according to an aspect of the disclosure.

Here, an improved version of a cam clamp is provided. In FIG. 19, a lever-less cam clamp 400 is contemplated to have a cam lobe 410 pivotably attached to a screw shaft 430 which can be inserted through both tubes 10, 20. The distal end of the screw shaft 430 can detachably attach to a nut 440 at its distal end.

This lever-less cam clamp 100 can quickly fasten and tighten structural tube 10 to structural tube 20.

The cam lobe 410 can have a key hole 412 located on the side of the cam lobe 410 to detachably receive a key 50 (see FIG. 3), such as a hex key. The receiving hole 412 can have a shape that corresponds with the key 450. Many different shapes are contemplated. In the embodiment shown, a hexagonal shape is provided to receive a hex key 450.

The cam lobe 410 can also have a first flat cam surface 416 and a second flat cam surface 418 perpendicular to the side where the key hole 412 is located. The cam lobe 410 is an eccentric cam and it pivots around center of rotation 414. As shown, the center of rotation 414 is positioned off center in the cam lobe 410. This off center location of the center of rotation 414 can produce one or more rises through its clamping cycle.

By using the contemplated lever-less cam clamp, the end consumer can easily and quickly assemble the furniture piece together especially when the inner side of the furniture piece has very little room to work in.

Another contemplated advantage of the lever-less cam clamp 100 is to minimize production cost by eliminating the lever, which is often made of aluminum or other metals. Also, in the embodiment where a hex key 50 is used, the end consumer can easily find replacement keys by using a typical hex key, when the original one provided by the furniture manufacturer is lost.

In operation, the end consumer first insert the screw shaft 430 through designed through holes (not shown) on structural tube 10 and structural tube 20. These designated through holes are provided by the furniture manufacturer. An optional retainer plate 450 can be placed between structural tube 10 and the cam lobe 410. In some embodiments, this retainer plate 450 is not present at all. The optional retainer plate 450 is a plate typically found in prior art cam clamps as shown in FIG. 18. Alternatively, the retainer plate 450 can be a washer. The end consumer then caps the distal end of the screw shaft 430 that has now extended through structural tube 20 with a nut 440. The nut 440 can next be slightly tightened onto the distal end of the screw shaft 430. At this point, the contemplated cam clamp 100 is shown in FIG. 19.

Figure 20:
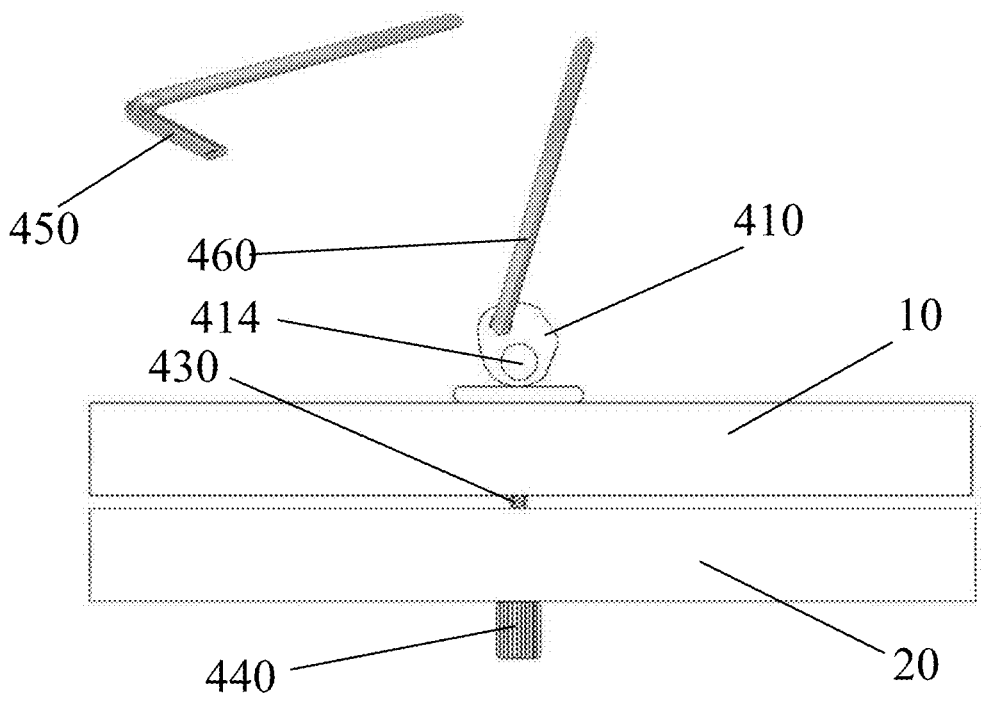
FIG. 20 is a side view of the cam lock of FIG. 19, according to an aspect of the disclosure.

Next, as shown in FIG. 20, a separately provided key 460 can be used to insert into receiving hole 112. As discussed above, many shapes are contemplated for the key 460. Here in FIG. 20, the key 460 shown is one embodiment where a flat end is provided and not a hexagonal shape. The flat end can be sufficiently sized to abuttingly fit within a hexagonal receiving hole 112 as shown in FIG. 20.

Figure 21:
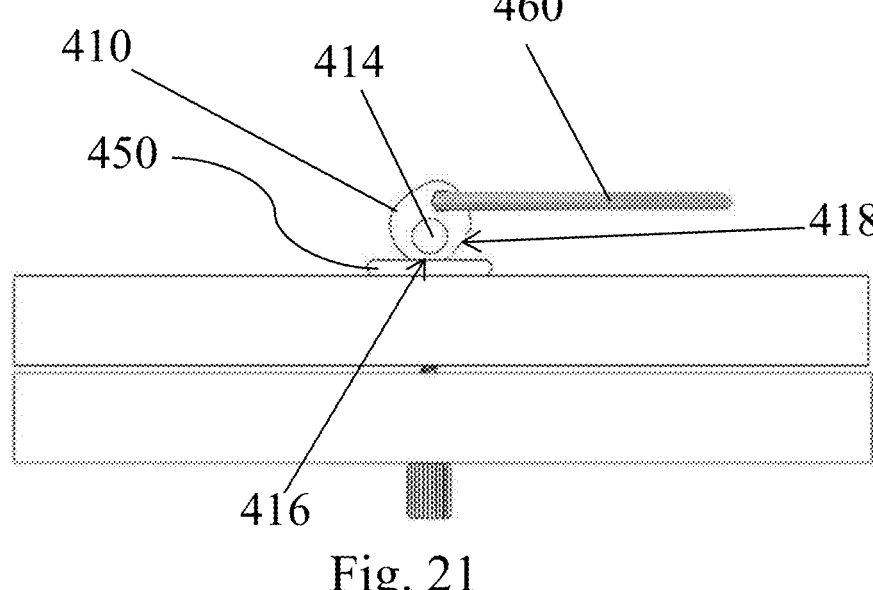
FIG. 21 is a side view of the cam lock of FIG. 19, according to an aspect of the disclosure.
Figure 22:
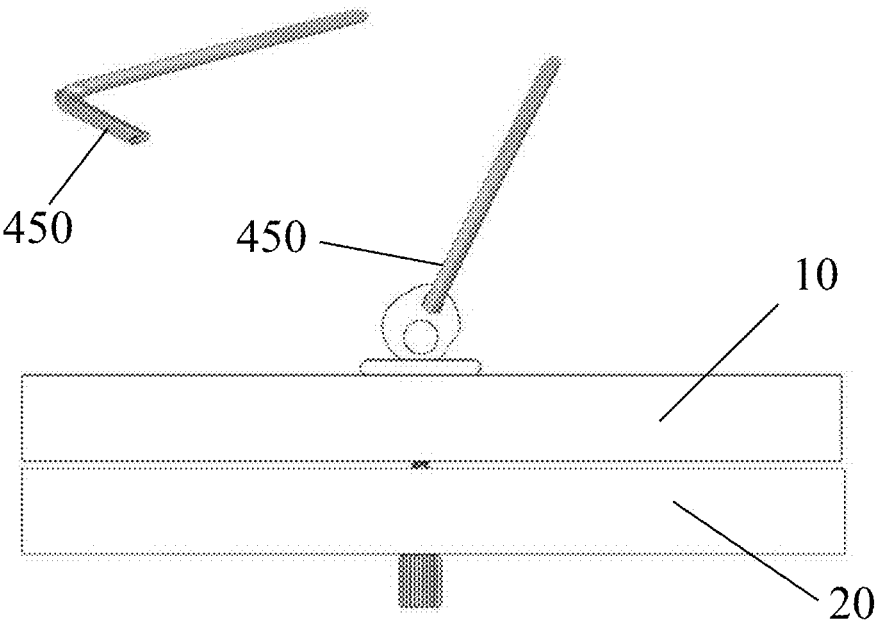
FIG. 22 is a side view of the cam lock of FIG. 19, according to an aspect of the disclosure.

The end consumer can next move the key 460 in a clockwise direction as shown in FIG. 21. This movement causes the cam lobe 410 to pivot around center of rotation 414. At this stage, the first flat cam surface 416 is laid flat against structural tube 10 thereby locking the cam lobe 410 in this position during the clamping cycle. Structural tube 10 is now closer to structural tube 20, as compared to FIG. 20.

As will be shown in the following figures, the contemplated cam lobe 410 can provide multi-stage locking positions during the clamping cycle, thereby allowing the cam lobe 410 to lock into various positions during the clamping cycle. This is important in that the end consumer may freely select a preferred locking position because the last locking position may not necessarily be the best locking position during assembling. Which locking position is most suitable can also depend on how tightly the nut 440 is screwed on to the screw shaft 430. Therefore, a typical prior art cam clamp (those shown in FIG. 18) which only has one true positive lock is generally not suitable.

Additionally, the multi-locking position advantageously allows the end consumer to repeatedly remove and reinsert the key 460 into the receiving hole 412 as the cam lobe 410 moves from one locking position to the next locking position.

Figure 23:
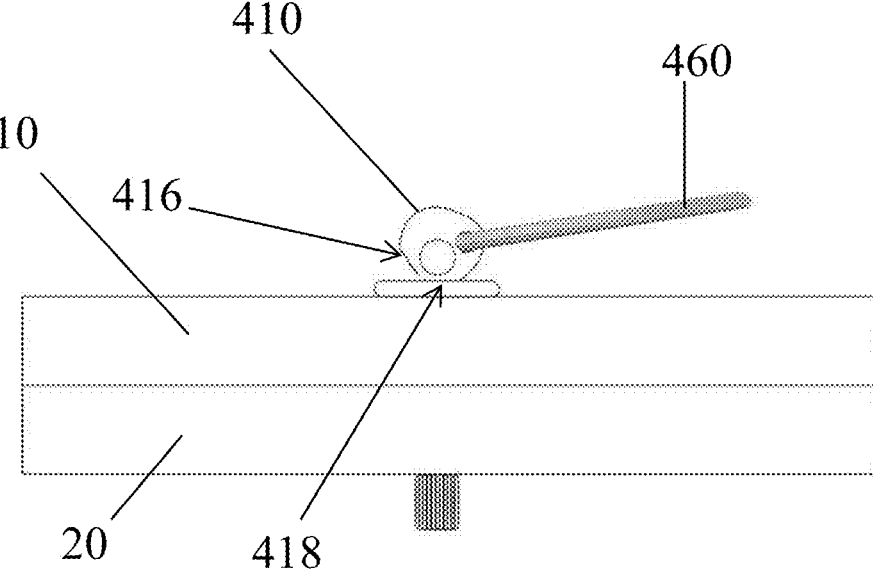
FIG. 23 is a side view of the cam lock of FIG. 19 in a fully locked position, according to an aspect of the disclosure.

In FIG. 23, the end consumer has turned the key 460 once again thereby moving the cam lobe 110 into another locking position where the second flat cam surface 418 is now laid flat against the structural tube 10. Structural tube 10 is now even closer to structural tube 20, as compared to what's shown in FIG. 21.

While the embodiments discussed and shown herein provides only two flat cam surfaces 416, 418, it is particularly contemplated that there may be just one, or more than two flat cam surfaces. Also, in other embodiments, these flat cam surface 416, 418 does not necessarily have to be "flat." They may have other shapes, textures and contours.

There may be provided an optional curved transition between the flat cam surfaces 416, 418 so as to smooth out the transition for the end consumer. In other embodiments, such curved transition does not exist.

Figure 24:
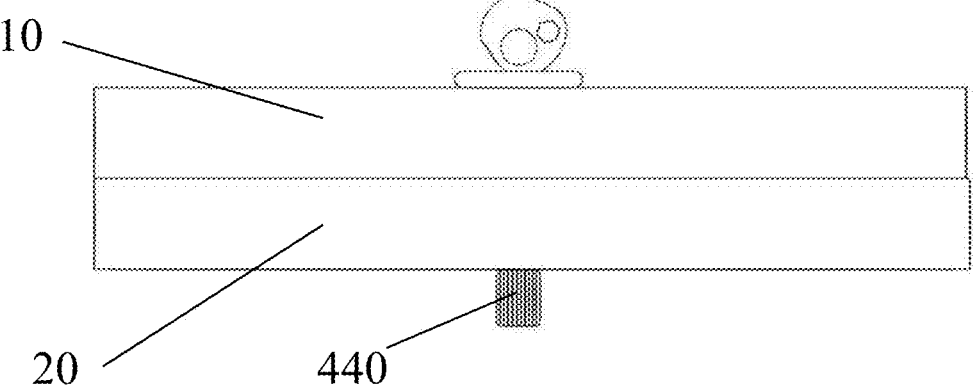
FIG. 24 is a side view of the cam lock of FIG. 19 in a fully locked position with the hex key removed, according to an aspect of the disclosure.
Figure 25:
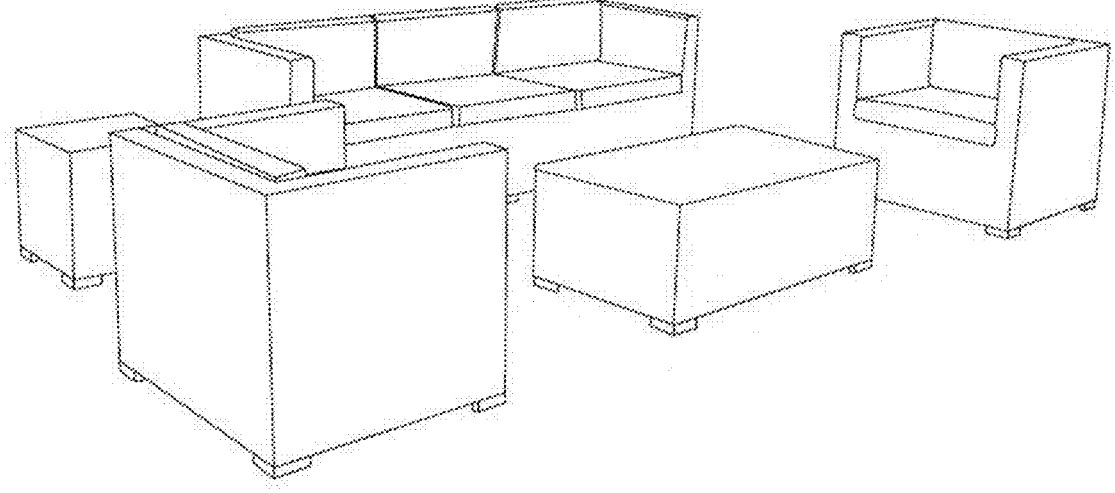
FIG. 25 illustrates exemplar furniture pieces, according to an aspect of the disclosure.

The end consumer may remove the key 460 at the conclusion of the clamping cycle (see FIG. 24).

Thus, specific embodiments and applications of toggle latches and pins have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. A modular furniture piece comprising:

an internal frame;

wherein the internal frame is comprised of a first structural beam and a second structural beam;

a plurality of couplers fastened on said internal frame to detachably couple a first structural beam to a second structural beam; and wherein the first structural beam has two walls;

wherein the second structural beam has two walls;

wherein each of said plurality of couplers includes a toggle latch and a pin;

wherein said toggle latch has a base plate, a catch arm and a main housing, wherein the catch arm is pivotably attached to the main housing;

wherein the base plate is pivotably attached to the main housing;

wherein the pin is disposed through at least one wall of the first structural beam;

wherein the pin is a rod or a bolt.

2. The modular furniture piece as recited in claim 1, wherein the catch arm is an arc-spring.

3. The modular furniture piece as recited in claim 2, wherein the pin has a pin head having a pin head opening, and wherein a distal end of the catch arm is received within the pin head opening.

4. The modular furniture piece as recited in claim 3, wherein the base plate is not fixedly coupled to the first structural beam, and wherein the base plate has a base insert adapted to be received within a receiving hole of the first structural beam.

5. The modular furniture piece as recited in claim 4 wherein the pin is disposed through the two walls of the first structural beam and through at least one wall of the second structural beam.

6. The modular furniture piece as recited in claim 4, wherein the modular furniture piece is at least one selected from a group consisting of an armchair, a lounge chair, a sofa, a side table, and a coffee table.

7. The modular furniture piece as recited in claim 6, wherein the outer covering includes a synthetic rattan.

8. The modular furniture piece as recited in claim 3, wherein the pin is disposed through the two walls of the first structural beam and through the two walls of the second structural beam.

9. The modular furniture piece as recited in claim 3 further comprising a base plate coupled to the main housing, and the base plate has a base aperture capable of receiving therethrough a distal end of the pin.

10. The modular furniture piece as recited in claim 3, further comprising a receiving ring disposed at a distal end of the catch arm, wherein the base plate is fixedly connected to the pin, and wherein the pin is sufficiently long such that a distal end of the pin is capable of being received within the receiving ring of the catch arm.

* * * * *